US012801319B2

(12) United States Patent
Kametani

(10) Patent No.: US 12,801,319 B2
(45) Date of Patent: Nov. 17, 2026

(54) IMAGE FORMING APPARATUS AND PRINTING SYSTEM

(71) Applicant: SHARP KABUSHIKI KAISHA, Sakai City (JP)

(72) Inventor: Yohsuke Kametani, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 216 days.

(21) Appl. No.: 18/750,525

(22) Filed: Jun. 21, 2024

(65) Prior Publication Data

US 2024/0427539 A1 Dec. 26, 2024

(30) Foreign Application Priority Data

Jun. 21, 2023 (JP) ................................. 2023-101288

(51) Int. Cl.
*G06F 3/12* (2006.01)

(52) U.S. Cl.
CPC ............ *G06F 3/1238* (2013.01); *G06F 3/127* (2013.01)

(58) Field of Classification Search
USPC ........................................................ 358/1.15
See application file for complete search history.

(56) References Cited

U.S. PATENT DOCUMENTS 6,430,711 B1 * 8/2002 Sekizawa ............ G06F 11/3068 358/1.14
11,567,716 B2 * 1/2023 Kawasaki ............. G06F 3/1204
2004/0190057 A1 * 9/2004 Takahashi ............. G06F 3/1205 358/1.15
2015/0092233 A1 * 4/2015 Park ................... H04N 1/00244 358/1.15
2017/0124564 A1 * 5/2017 Pi Farias ................. G06F 9/445

FOREIGN PATENT DOCUMENTS

JP 2006-218649 A 8/2006

* cited by examiner

*Primary Examiner* — Darryl V Dottin
(74) *Attorney, Agent, or Firm* — ScienBiziP, P.C.

(57) ABSTRACT

An image forming apparatus is provided with: a print job acquirer which acquires a print job; a print job manager which stores, when owner discriminating information based on which an individual is uniquely discriminable is added to the print job, the print job in a storage destination decided according to the owner discriminating information; and a display which displays storage destination information.

12 Claims, 12 Drawing Sheets

FIG. 3

301

| PRINT JOB NAME | USER INFORMATION | | OWNER DISCRIMINATING INFORMATION | | PRINT DATA |
|---|---|---|---|---|---|
| | USER NAME | TERMINAL NAME | TYPE | OWNER DISCRIMINATING DATA | |
| JOB NAME 1 | USER A | PC A | ID | USERID-A | .... |

FIG. 6

601

| PRINT JOB IDENTIFICATION INFORMATION | | USER INFORMATION | | OWNER DISCRIMINATING INFORMATION | | FOLDER NAME | FOLDER BUTTON NAME |
|---|---|---|---|---|---|---|---|
| PRINT JOB NUMBER | PRINT JOB NAME | USER NAME | TERMINAL NAME | TYPE | OWNER DISCRIMINATING DATA | | |
| 1 | JOB NAME 1 | USER A | PC A | ID | USERID-A | USERID-A | USER A/[USERID-A] |
| 2 | JOB NAME 2 | user a | Note PC | ID | USERID-A | USERID-A | USER A/[USERID-A] |
| 3 | JOB NAME 3 | USER A | Phone B | ID | USERID-A | USERID-A | USER A/[USERID-A] |
| 4 | JOB NAME 4 | USER B | PC C | N/A | N/A | USER B/PC B | USER B/PC B |
| 5 | JOB NAME 5 | USER B | Phone D | FACE IMAGE | BBBBBB(ENCODED DATA) | PhotoID-A | USER B/[PhotoID-A] |
| 6 | JOB NAME 6 | Unknown User | PC E | FACE IMAGE | BBBBBB(ENCODED DATA) | PhotoID-A | USER B/[PhotoID-A] |
| 7 | JOB NAME 7 | user c | PC A | FACE IMAGE | BBBBBB(ENCODED DATA) | PhotoID-A | USER B/[PhotoID-A] |
| 8 | JOB NAME 8 | Unknown User | PC C | ID | ID-C | ID-C | ID-C |

IMAGE FORMING APPARATUS AND PRINTING SYSTEM

BACKGROUND

Field

The present disclosure relates to an image forming apparatus and a printing system. This application is based upon and claims the benefit of priority from Japanese Patent Application No. 2023-101288, filed Jun. 21, 2023, the entire contents of which are incorporated herein by reference.

Description of the Background Art

Conventionally, there is known an image forming apparatus which receives print data and setting data from a host device, and performs reprinting on the basis of the print data and the setting data. In the image forming apparatus disclosed in the conventional technology, it is known that the setting data includes at least one of print setting information, path information for identifying the print data, a job ID, a thumbnail of the print data, a host name, reprint permitted user information, print date and time, and confidential information.

SUMMARY

In a printing system, print data may be transmitted to an image forming apparatus from a plurality of host devices by an operation of the same person. In that case, since the image forming apparatus disclosed in the conventional technology cannot manage print jobs according to each owner of the print job, setting data respectively corresponding to the print data may be different according to the host device. Therefore, in the image forming apparatus disclosed in the conventional technology, in order for the user to select print data, search criteria indicating the setting data corresponding to the desired print data must be input. Therefore, in the image forming apparatus disclosed in the conventional technology, the user needs to remember the setting data corresponding to the desired print data.

Therefore, an object of one aspect of the present disclosure is to provide an image forming apparatus and a printing system capable of managing print jobs according to each owner of the print job.

An image forming apparatus according to one embodiment of the present disclosure is provided with: a print job acquirer which acquires a print job; a print job manager which stores, when owner discriminating information based on which an individual is uniquely discriminable is added to the print job, the print job in a storage destination decided according to the owner discriminating information; and a display which displays storage destination information.

A printing system according to one embodiment of the present disclosure includes an image forming apparatus and an information terminal which transmits a print job to the image forming apparatus, and the image forming apparatus is provided with: a print job acquirer which acquires the print job from the information terminal; a print job manager which stores, when owner discriminating information based on which an individual is uniquely discriminable is added to the print job, the print job in a storage destination decided according to the owner discriminating information; and a display controller which displays storage destination information.

BRIEF DESCRIPTION OF THE DRAWINGS

FIG. 3 is a diagram illustrating an example of a print job.

FIG. 6 is a diagram illustrating an example of a print job table.

DESCRIPTION OF THE PREFERRED EMBODIMENTS

First Embodiment

Figure 1:
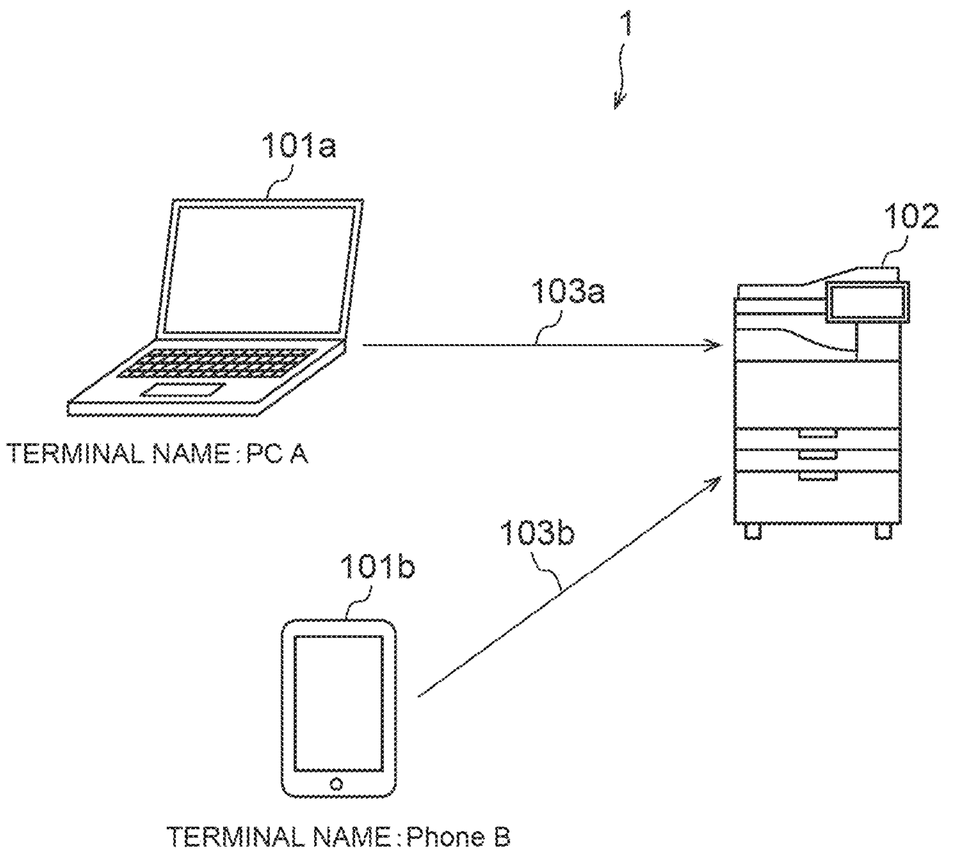
FIG. 1 is a diagram illustrating an example of an overall configuration of a printing system.

A first embodiment will be described with reference to FIGS. 1 to 13. In the drawings, the same or similar elements are denoted by the same reference numerals, and redundant description thereof will be omitted.

FIG. 1 is a diagram illustrating an example of an overall configuration of a printing system 1. The printing system 1 includes an information terminal 101 and an image forming apparatus 102. The information terminal 101 and the image forming apparatus 102 are connected to each other via a wired or wireless network. For example, the network is the Internet, a local area network (LAN), or the like.

The information terminal 101 is a terminal device operated by a user. For example, the information terminal 101 is a smartphone, a notebook personal computer (PC), a tablet terminal, a desktop PC, or the like. The information terminal 101 transmits a print job to the image forming apparatus 102.

The image forming apparatus 102 includes a device which prints print data. The image forming apparatus 102 saves print jobs transmitted from the information terminal 101, and executes, when a printing operation is received, processing of printing the print data added to a selected print job. As the image forming apparatus 102 executes the processing of printing the print data, a multicolor or monochrome image is formed on a predetermined sheet of paper in accordance with the print data.

For example, the printing system 1 exemplified in FIG. 1 includes an information terminal 101*a* having the terminal name "PC A", an information terminal 101*b* having the terminal name "Phone B", and the image forming apparatus 102.

For example, when a plurality of users use the information terminal 101*a* by sharing, it is assumed that a certain user transmits, from the information terminal 101*a*, a print job 103*a* to the image forming apparatus 102 in a state in which he/she has logged into the information terminal 101*a* by a shared user name. Further, it is assumed that the certain user transmits, from the information terminal 101*b*, a print job 103*b* to the image forming apparatus 102 in a state in which he/she has logged into the information terminal 101*b*. Let us suppose that the image forming apparatus 102 stores the print job 103*a* and the print job 103*b* in storage destinations decided according to the transmission sources, respectively. In that case, with respect to the print job 103*a* and the print job 103*b*, the user is required to remember the transmission source of the print job 103*a* and the transmission source of the print job 103*b* in order to specify a print job whose owner is the user himself/herself.

However, the image forming apparatus 102 stores the print job 103*a* and the print job 103*b* in a storage destination decided according to the owner of the print job. Therefore, when the user is to perform a printing operation, he/she can easily specify the print job 103*a* and the print job 103*b* whose owner is the user himself/herself without remembering the transmission source of the print job 103*a* and the transmission source of the print job 103*b*.

Figure 2:
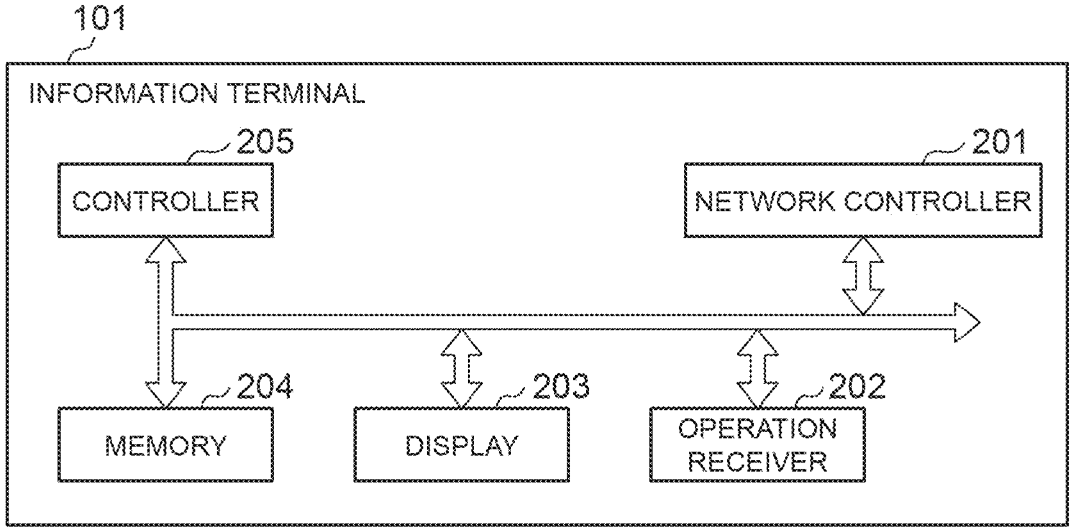
FIG. 2 is a block diagram illustrating an example of a configuration of an information terminal.

FIG. 2 is a block diagram illustrating an example of the configuration of the information terminal 101. The information terminal 101 is provided with a network controller 201, an operation receiver 202, a display 203, a memory 204, and a controller 205.

The network controller 201 is connected to the network and communicates with the image forming apparatus 102.

The operation receiver 202 receives an operation by the user. For example, the operation receiver 202 is configured from a touch panel, a mouse, a keyboard, and the like.

The display 203 displays information to be presented to the user. For example, the display 203 is composed of a liquid crystal panel, an organic electro-luminescence (EL) panel, or the like.

The memory 204 is a storage medium capable of storing various kinds of data, programs, and the like. The memory 204 is composed of, for example, a hard disk drive (HDD), a solid state drive (SSD), a semiconductor memory, or the like.

The controller 205 executes various kinds of processing in accordance with the programs stored in the memory 204. For example, the controller 205 is configured from a processor such as a central processing unit (CPU).

The controller 205 causes the display 203 to display a screen on which print data to be printed can be selected on the basis of the operation by the user received by the operation receiver 202. Further, the controller 205 generates a print job to which the selected print data is added. Then, the controller 205 transmits the generated print job to the image forming apparatus 102 via the network controller 201. The print data represents data in a page description language format. Further, user information is added to the print job. The user information indicates at least one of a terminal name, which is assigned to the information terminal 101 serving as a transmission source of the print job, and a user name, which indicates the user of the information terminal 101.

Further, the controller 205 can add owner discriminating information to the print job. The owner discriminating information indicates information based on which an individual is uniquely discriminable. For example, the owner discriminating information indicates a user account different from the user name indicating the user of the information terminal 101, biological information, or the like. For example, the user account indicated by the owner discriminating information is identification information assigned to the individual in order to enable use of a service or the like that is not associated with the information terminal 101. Further, for example, the biological information indicated by the owner discriminating information is a feature detected from a face image, a feature detected from fingerprint data, or the like.

FIG. 3 is a diagram illustrating an example of a print job. A print job name, user information, owner discriminating information, and print data are added to a print job 301 exemplified in FIG. 3. The print job name is the name assigned to the print job.

The user information added to the print job 301 indicates a combination of a user name and a terminal name. The user name indicated by the user information represents the name of the user logging into the information terminal 101. The terminal name indicated by the user information is set to the information terminal 101, and represents the name assigned to the information terminal 101. The owner discriminating information added to the print job 301 indicates a combination of owner discriminating data and a type of the owner discriminating data. The owner discriminating data indicated by the owner discriminating information is data representing information by which an individual who is the owner of the print job is uniquely discriminable.

Figure 4:
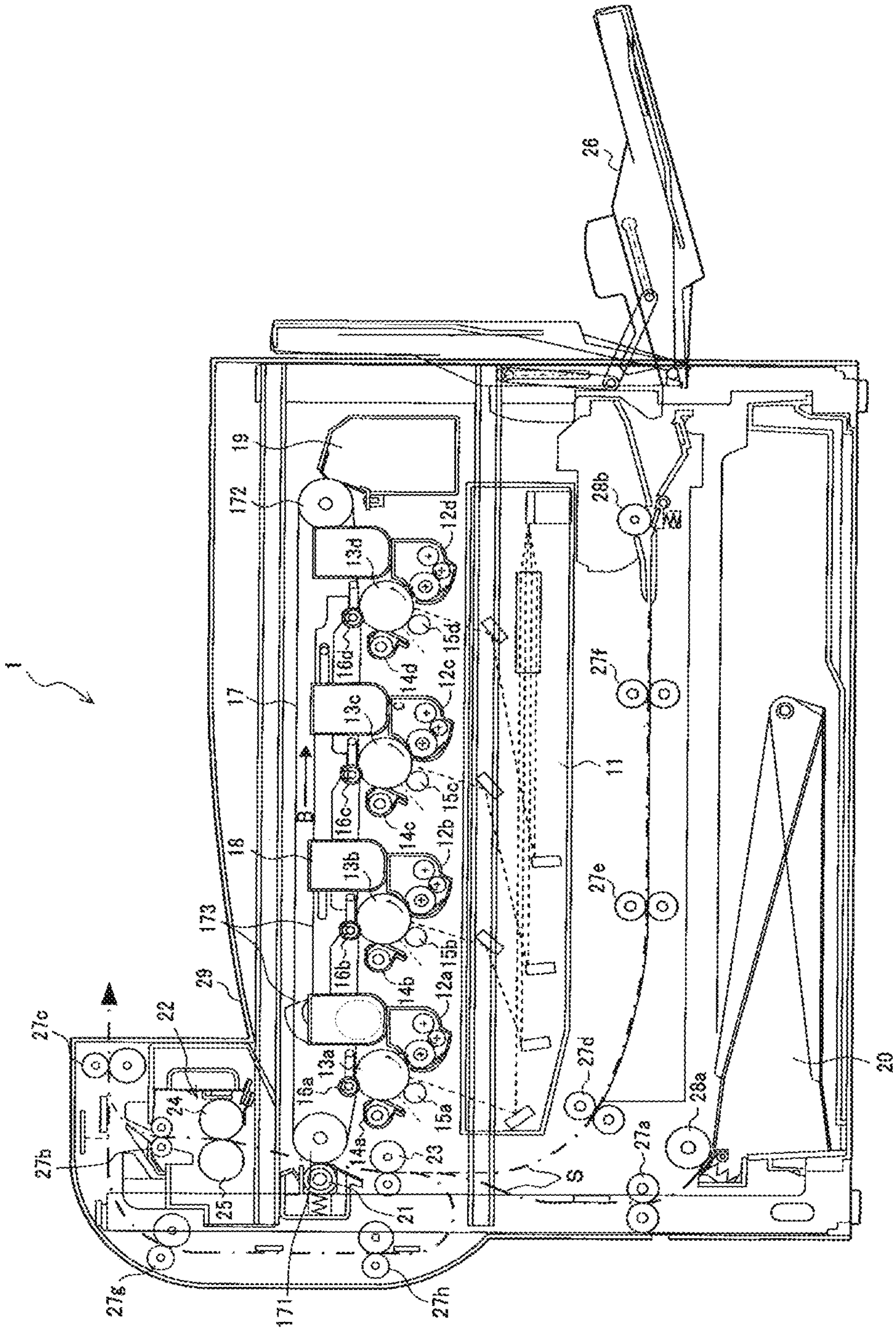
FIG. 4 is a diagram illustrating an example of a structure of an image forming apparatus.

FIG. 4 is a diagram illustrating an example of the structure of the image forming apparatus 102. FIG. 4 shows the part corresponding to a printer controller 503 exemplified in FIG. 5. Note that the structure of the image forming apparatus 102 exemplified in FIG. 4 is merely an example of the structure of the image forming apparatus 102, and is not intended to restrict the structure of the image forming apparatus 102.

The image forming apparatus 102 is provided with an exposure unit 11, developing devices 12*a* to 12*d*, photosensitive drums 13*a* to 13*d*, cleaner units 14*a* to 14*d*, chargers 15*a* to 15*d*, an intermediate transfer belt unit 18, a paper feed tray 20, a fusing unit 22, a paper discharge tray 29, and the like.

The exposure unit 11 is configured by using a laser scanning unit provided with a laser irradiator, a reflecting mirror, and the like. The exposure unit 11 may be configured by using an electro-luminescence (EL) or light-emitting diode (LED) writing head in which light-emitting elements are arranged in an array.

The photosensitive drums 13*a* to 13*d* are uniformly charged to a predetermined potential by means of the chargers 15*a* to 15*d*. The chargers 15*a* to 15*d* are charging devices. As the charged photosensitive drums 13*a* to 13*d* are exposed to light in accordance with the input image data, an electrostatic latent image corresponding to the image data is formed on a surface of each of the photosensitive drums 13*a* to 13*d*.

The developing devices 12*a* to 12*d* make the electrostatic latent images formed on the respective photosensitive drums 13*a* to 13*d* visible with toners, thereby forming toner images on the photosensitive drums 13*a* to 13*d*.

The cleaner units 14*a* to 14*d* remove and collect the toners remaining on the surfaces of the photosensitive drums 13*a* to 13*d*.

The intermediate transfer belt unit 18 is provided with intermediate transfer rollers 16*a* to 16*d*, an intermediate transfer belt 17, an intermediate transfer belt driving roller 171, an intermediate transfer belt driven roller 172, an intermediate transfer belt tension mechanism 173, an intermediate transfer belt cleaning unit 19, and the like. The intermediate transfer belt driving roller 171, the intermediate transfer belt driven roller 172, and the intermediate transfer belt tension mechanism 173 cause the intermediate transfer belt 17 to be stretched therearound, and rotationally drive the intermediate transfer belt 17.

The intermediate transfer rollers 16*a* to 16*d* are rotatably supported on the intermediate transfer belt tension mechanism 173 of the intermediate transfer belt unit 18. The intermediate transfer rollers 16*a* to 16*d* each apply a transfer bias for transferring the toner images formed on the photosensitive drums 13*a* to 13*d* onto the intermediate transfer belt 17.

Further, the intermediate transfer belt 17 is provided so as to come into contact with each of the photosensitive drums 13*a* to 13*d*, and allows the toner images of the respective colors formed on the photosensitive drums 13*a* to 13*d* to be layered and transferred on the intermediate transfer belt 17. In this way, a multicolored toner image is formed on the intermediate transfer belt 17. That is, electrostatic images made visible on the respective photosensitive drums 13*a* to 13*d* according to the hues are layered on the intermediate transfer belt 17. Then, as the intermediate transfer belt 17 is rotated, a layered image on the intermediate transfer belt 17 is transferred onto a sheet of paper by a transfer roller 21 disposed at a position of contact between the sheet of paper and the intermediate transfer belt 17.

The paper feed tray 20 is a tray for stocking sheets of paper. The paper discharge tray 29 is a tray for placing the printed sheets of paper.

Furthermore, the image forming apparatus 102 is provided with the transfer roller 21, a registration roller 23, conveyance rollers 27*a* to 27*h*, pickup rollers 28*a* and 28*b*, and the like.

The conveyance rollers 27*a* to 27*h* are rollers for promoting and assisting a sheet of paper to be conveyed. The pickup roller 28*a* is provided at an end portion of the paper feed tray 20, and is a roller for feeding the sheets of paper one by one from the paper feed tray 20 to a paper conveyance path.

The registration roller 23 temporarily holds recording paper being conveyed to the paper conveyance path, and conveys the recording paper to the transfer roller 21 at a timing of bringing a leading end of the toner images formed on the photosensitive drums 13*a* to 13*d* and a leading end of the paper into line with each other.

The fusing unit 22 is provided with a heat roller 24, a pressure roller 25, and the like. The heat roller 24 and the pressure roller 25 rotate with a sheet of paper sandwiched therebetween. The heat roller 24 is set to a predetermined fixing temperature, and thermally compresses the sheet of paper together with the pressure roller 25, thereby fusing, mixing, and pressing the multicolored toner image transferred onto the sheet of paper, so that the multicolored toner image is thermally fixed to the sheet of paper. The sheet of paper on which the multicolored toner image is thermally fixed is reversed by the conveyance rollers 27*h*, 27*g*, and 27*c*, and is discharged onto the paper discharge tray 29 in a state of being reversed.

Further, a manual feed tray 26 is disposed in the image forming apparatus 102. The pickup rollers 28*a* and 28*b* are disposed in order to feed paper from the paper feed tray 20 or the manual feed tray 26. The pickup rollers 28*a* and the 28*b* convey the sheets of paper one by one to the paper conveyance path from the paper feed tray 20 or the manual feed tray 26.

When single-sided printing which performs printing on only one side of the sheet of paper is requested, a sheet of paper conveyed from the paper feed tray 20 is conveyed to the registration roller 23 by the conveyance roller 27*a*. Then, the sheet of paper is conveyed to the transfer roller 21 at a timing of aligning the leading end of the recording paper and the leading end of a layered image formed on the intermediate transfer belt 17 with each other, and the layered image on the intermediate transfer belt 17 is transferred onto the sheet paper. After that, as the sheet of paper passes through the fusing unit 22, unfixed toner on the sheet of paper is fused by heat and is fixed, and the sheet of paper is discharged onto the paper discharge tray 29 from the conveyance roller 27*c* via the conveyance roller 27*b*.

Further, a sheet of paper stacked on the manual feed tray 26 is fed by the pickup roller 28*b*, reaches the registration roller 23 via the conveyance rollers 27*f*, 27*e*, and 27*d*, and is discharged thereafter to the paper discharge tray 29 through the same progress as that of the sheet of paper fed from the paper feed tray 20.

Furthermore, when double-sided printing which performs printing on both sides of the sheet of paper is requested, a rear end of the sheet of paper, which has passed through the heat roller 24, the pressure roller 25, and the like, after completion of the single-sided printing, is sandwiched between the conveyance rollers 27*c*, and the conveyance rollers 27*c* are reversely rotated. As a result of the reverse rotation, after the sheet of paper has been conveyed to the conveyance rollers 27*g* and 27*h*, printing on the back side is performed by way of the registration roller 23, and the sheet of paper is thereafter discharged to the paper discharge tray 29.

Figure 5:
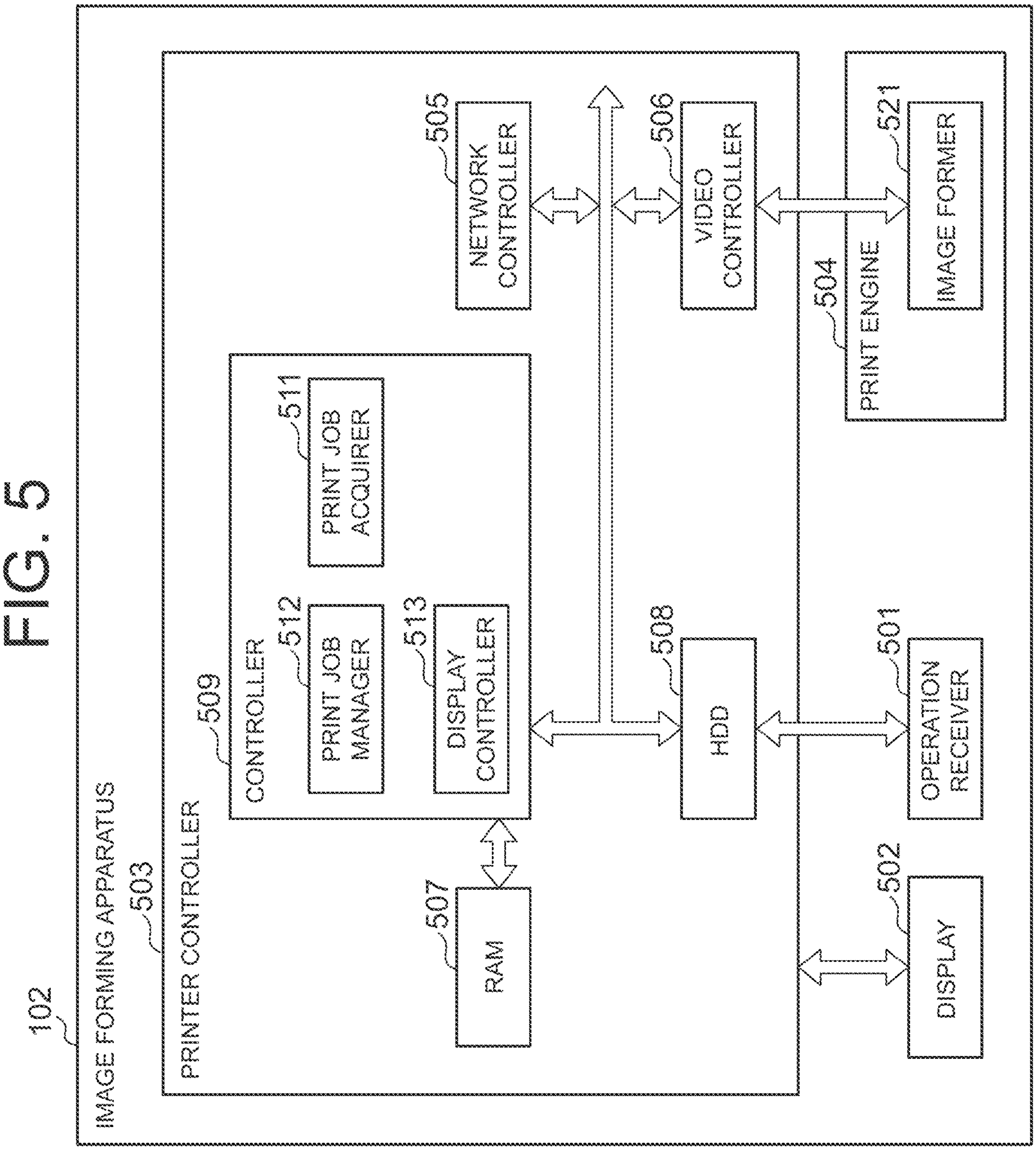
FIG. 5 is a block diagram illustrating an example of a configuration of the image forming apparatus.

FIG. 5 is a block diagram illustrating an example of the configuration of the image forming apparatus 102. The image forming apparatus 102 is provided with an operation receiver 501, a display 502, the printer controller 503, and a print engine 504.

The operation receiver 501 receives an operation by the user. For example, the operation receiver 501 is configured from a touch panel or the like. The display 502 displays information to be presented to the user. Specifically, the display 502 indicates storage destination information. The storage destination information indicates a display name of the storage destination of the print job. For example, the display name of the storage destination of the print job is a folder button name. For example, the display 502 is composed of a liquid crystal panel, an organic electro-luminescence (EL) panel, or the like. Note that a touch panel display in which the operation receiver 501 and the display 502 are integrally formed may be configured.

The printer controller 503 is provided with a network controller 505, a video controller 506, a random access memory (RAM) 507, an HDD 508, and a controller 509.

The network controller 505 is connected to the network and communicates with the information terminal 101.

The video controller 506 controls the print engine 504 to output print data added to a print job selected by the user operation.

The RAM 507 is one or more storage medium which stores data temporarily required by the controller 509 to execute a program.

The HDD 508 is one or more storage medium capable of storing various kinds of data, programs, and the like. The HDD 508 stores therein print jobs transmitted from the information terminal 101, a print job table 601 (see FIG. 6), and the like.

The controller 509 executes various kinds of processing in accordance with the programs stored in the HDD 508. For example, the controller 509 is configured from one or more processor such as a CPU. The controller 509 is provided with a print job acquirer 511, a print job manager 512, and a display controller 513.

As the print job acquirer 511 receives a print job transmitted from the information terminal 101, the print job is acquired.

When owner discriminating information is added to the print job, the print job manager 512 stores the print job in a storage destination decided according to the owner discriminating information added to the print job. More specifically, when the owner discriminating information is added to the print job, the print job manager 512 decides on a folder name of a folder, which is the storage destination, on the basis of the owner discriminating information. Then, the print job manager 512 stores the print job in a storage destination corresponding to the folder having the decided folder name.

The display controller 513 causes the display 502 to display a folder button which has the folder button name decided according to the user information and the owner discriminating information, and via which a print job can be selected.

The print engine 504 executes processing of printing print data added to the selected print job. The print engine 504 is provided with an image former 521.

The image former 521 performs printing on a sheet of paper on the basis of the print data output from the video controller 506. The image former 521 has the structure exemplified in

FIG. 4.

FIG. 6 is a diagram illustrating an example of the print job table 601.

In the print job table 601, print job identification information, user information, owner discriminating information, a folder name, and a folder button name are registered in association with each other. The print job identification information indicates a combination of a print job number and a print job name. The print job number is the number assigned to the print job.

For example, in the print job table 601 exemplified in FIG. 6, the user names and the terminal names associated with print job numbers 1 to 3, respectively, are different from one another. This indicates that, when the print jobs to which print job numbers 1 to 3 are assigned are transmitted to the image forming apparatus 102, the user name of the user logging into the information terminal 101, which is the transmission source of the print job, and the information terminal 101 are different from one another in the respective print jobs.

However, in the print job table 601, owner discriminating data associated with each of print job numbers 1 to 3 is USERID-A, which is the same owner discriminating data. Further, in the print job table 601, the same folder name "USERID-A" is associated with each of print job numbers 1 to 3. Consequently, the print jobs to which print job numbers 1 to 3 are assigned in the print job table 601 are stored in a folder having the folder name "USERID-A". In other words, the print job table 601 indicates that the print jobs of the same owner are stored in the same storage destination even if the user name of the user logging into the information terminal 101, which is the transmission source of the print job, or the information terminal 101 is different in those print jobs.

Figure 7:
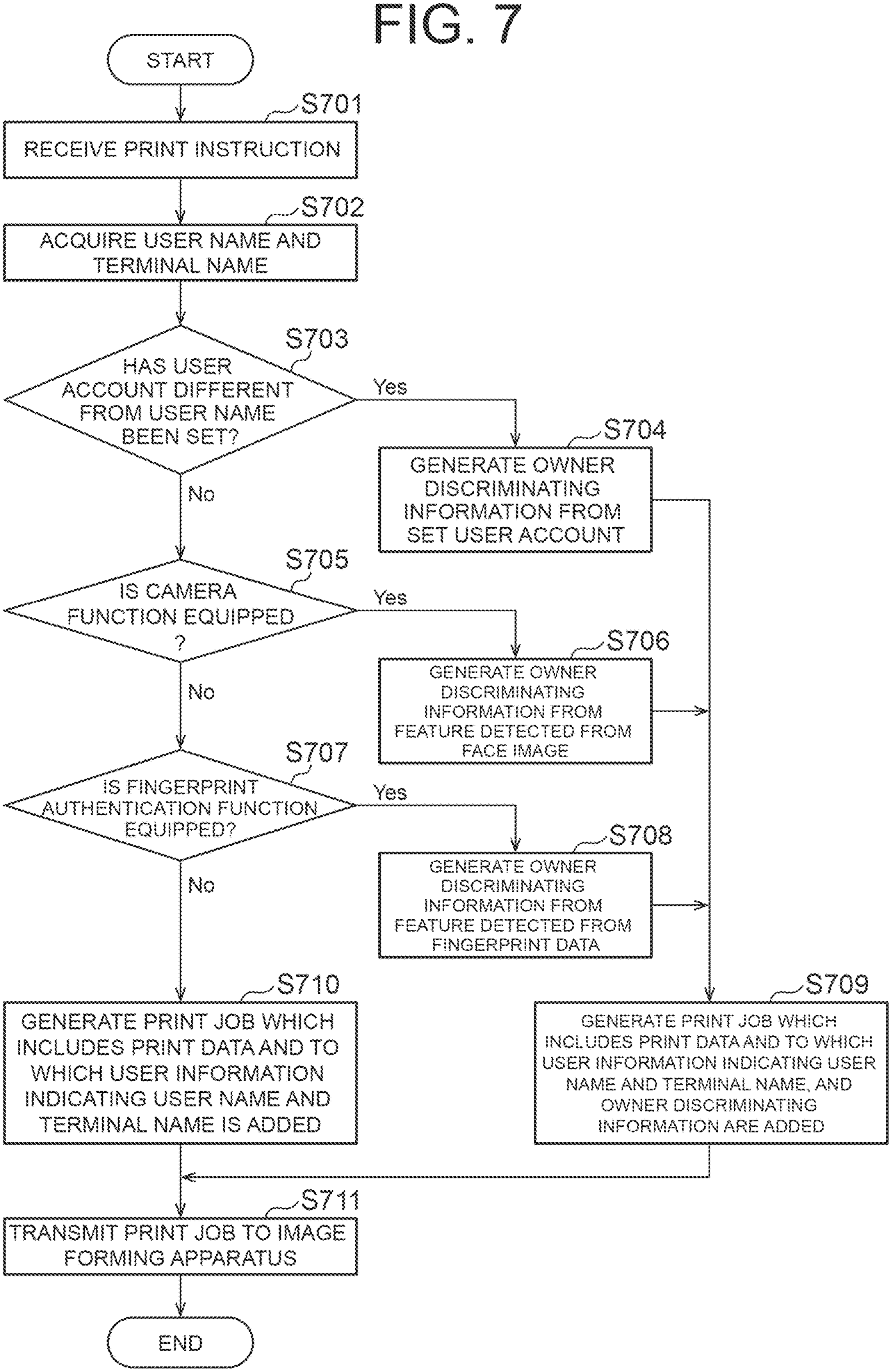
FIG. 7 is a flowchart illustrating an example of an action of the information terminal.

FIG. 7 is a flowchart illustrating an example of an action of the information terminal 101.

In step S701, when the controller 205 has received a print instruction as the operation receiver 202 has received an operation to select print date stored in the memory 204, the controller 205 acquires a user name and a terminal name in step S702.

For example, in a case where a user has logged into the information terminal 101 and the user is authenticated, the controller 205 acquires the user name of the user logging into the information terminal 101, and the terminal name set to the information terminal 101.

Figure 8:
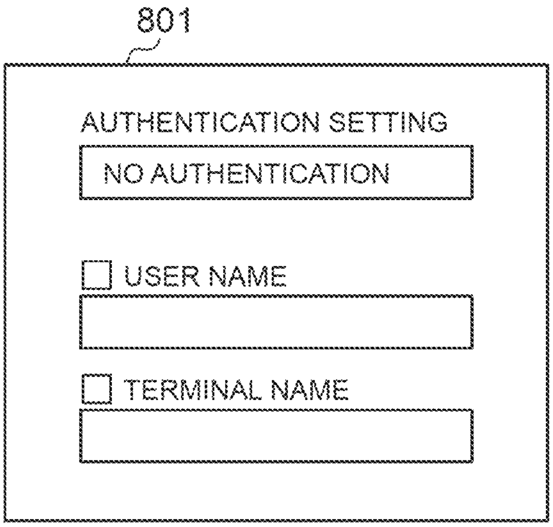
FIG. 8 is a diagram illustrating an example of a setting screen.

When a user has not logged into the information terminal 101 and the user is not authenticated, the controller 205 may cause the display 203 to display a setting screen 801 (see FIG. 8). When the operation receiver 202 has received an operation to input the user name and the terminal name on the setting screen 801, the controller 205 acquires the input user name and terminal name in step S702.

In step S703, the controller 205 determines whether or not a user account different from the user name is set to the information terminal 101.

In step S703, if a user account different from the user name is set to the information terminal 101, in step S704, the controller 205 generates owner discriminating information from the set user account. Specifically, the controller 205 generates owner discriminating information indicating a combination of a type, which represents the user account, and owner discriminating data, which is a character string representing the user account. Then, the controller 205 shifts the processing to step S709. By virtue of the processing of step S704, the information terminal 101 can generate the owner discriminating information from the user account stored in the memory 204 without troubling the user to input a user account different from the user name.

Meanwhile, in step S703, if a user account different from the user name is not set to the information terminal 101, the controller 205 determines, in step S705, whether or not the information terminal 101 is equipped with a camera function.

In step S705, when the information terminal 101 is equipped with a camera function, in step S706, the controller 205 detects a feature from a face image which has been acquired by capturing an image of a face of the user by the camera function, and generates the owner discriminating information from the detected feature. For example, when a face image acquired by capturing an image of a face of the user by the camera function is stored in the memory 204, the controller 205 detects a feature from the face image. Then, the controller 205 encodes the detected feature and generates the owner discriminating data. Then, the controller 205 generates the owner discriminating information indicating a combination of a type, which represents the face image, and the generated owner discriminating data. Then, the controller 205 shifts the processing to step S709.

Meanwhile, in step S705, if the information terminal 101 is not equipped with a camera function, the controller 205 determines, in step S707, whether or not the information terminal 101 is equipped with a fingerprint authentication function.

In step S707, if the information terminal 101 is equipped with a fingerprint authentication function, in step S708, the controller 205 detects a feature from fingerprint data which has been acquired by the fingerprint authentication function, and generates the owner discriminating information from the detected feature. Specifically, the controller 205 acquires the fingerprint data by the fingerprint authentication function. For example, when fingerprint data acquired by the fingerprint authentication function is stored in the memory 204, the controller 205 detects a feature from the fingerprint data. Then, the controller 205 encodes the detected feature, thereby generating the owner discriminating data. Then, the controller 205 generates the owner discriminating information indicating a combination of a type, which represents the fingerprint data, and the generated owner discriminating data. Then, the controller 205 shifts the processing to step S709.

In step S709, the controller 205 generates a print job to which the print data selected in step S701, the user information indicating the user name and the terminal name acquired in step S702, and the owner discriminating information generated in step S704, step S706, or step S708 are added. Then, the controller 205 shifts the processing to step S711.

As exemplified by the processing from step S703 to step S708, the owner discriminating information belongs to the type decided on the basis of setting information related to the action of the information terminal 101. The setting information indicates whether or not a user account different from the user name is set, whether or not a camera function is enabled, whether or not a fingerprint authentication function is enabled, and the like. The owner discriminating information exemplified in the steps from step S703 to step S709 is an example, and the details of the owner determination information are not particularly limited as long as the owner discriminating information is information based on which an individual who is the owner of the print job is uniquely discriminable. Also, in the above description, while processing of adding the owner discriminating information generated in step S704, step S706, or step S708 to the print job has been exemplified, the owner discriminating information may be one that is selectable by an operation of the user on the information terminal 101.

By virtue of the processing from step S703 to step S709, the information terminal 101 can generate the owner discriminating information without troubling the user to input the owner discriminating information.

Meanwhile, in step S707, if the information terminal 101 is not equipped with a fingerprint authentication function, in step S710, the controller 205 generates a print job to which the user information indicating the user name and the terminal name acquired in step S702, and the selected print data are added. Then, the controller 205 shifts the processing to step S711.

In step S711, the controller 205 transmits the print job generated in step S709 or step S710 to the image forming apparatus 102.

FIG. 8 is a diagram illustrating an example of the setting screen 801. The setting screen 801 shows the state in which a login is not made by a user, and the user is not authenticated. In that case, the controller 205 causes the display 203 to display the setting screen 801, and causes the user of the information terminal 101 to input the user name and the terminal name.

Figure 9:
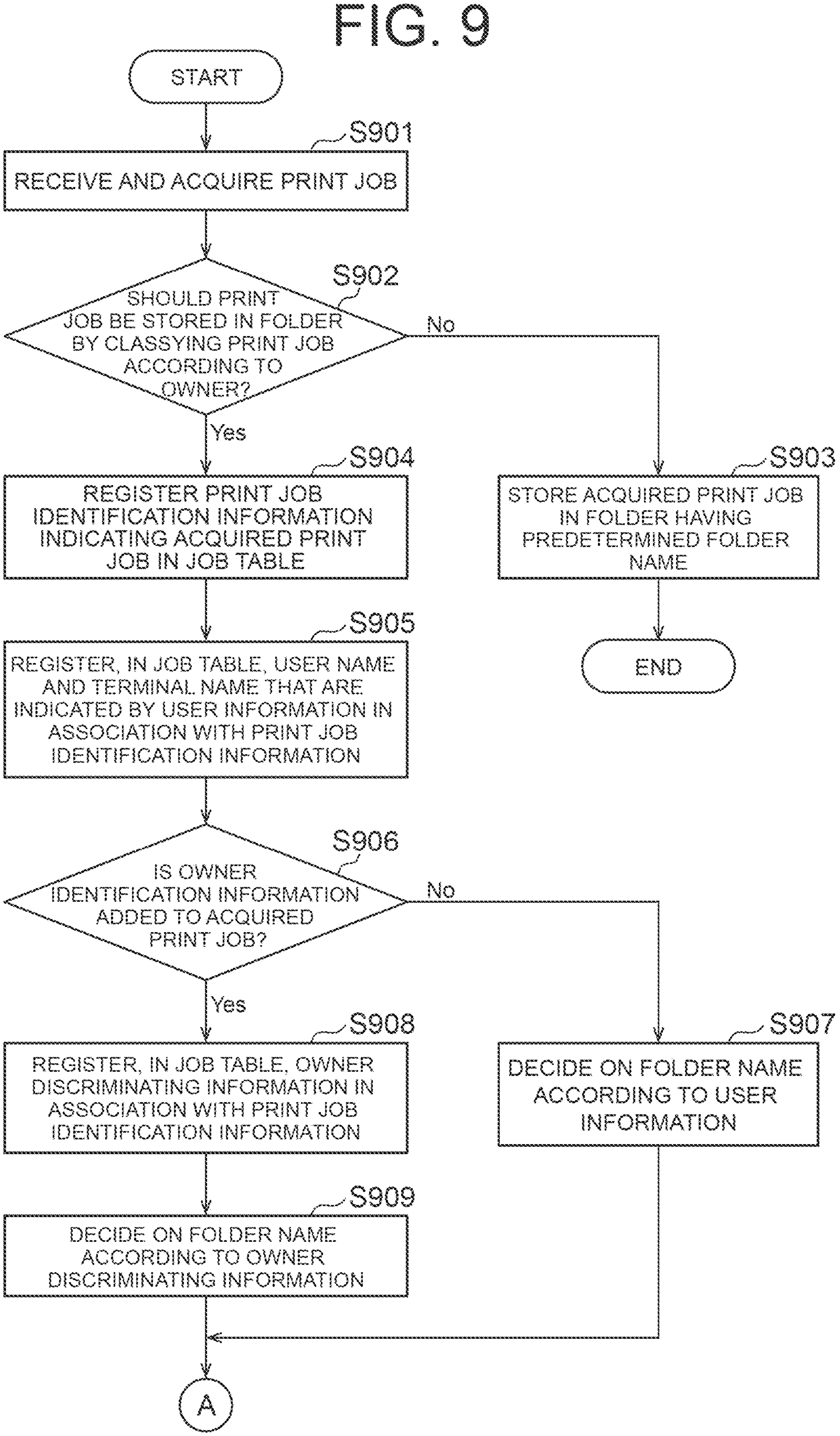
FIG. 9 is a flowchart illustrating an example of processing of storing a print job in a folder in the image forming apparatus.

FIG. 9 is a flowchart illustrating an example of processing of storing a print job in a folder in the image forming apparatus 102.

In step S901, when the print job acquirer 511 has acquired a print job by receiving the print job via the network controller 505, the print job manager 512 determines, in step S902, whether or not the acquired print job should be stored in a folder by classifying the print job according to the owner of the print job. In step S902, if the acquired print job is not to be stored in a folder by classifying the print job according to the owner of the print job, the print job manager 512 stores, in step S903, the acquired print job in a storage destination corresponding to a predetermined folder. Then, the controller 509 ends the processing.

Meanwhile, in step S902, if the acquired print job is to be stored in a folder by classifying the print job according to the owner of the print job, the print job manager 512 registers, in step S904, print job identification information indicating the acquired print job in the print job table 601.

In step S905, the print job manager 512 registers, in the print job table 601, the user name and the terminal name, which are indicated by the user information added to the acquired print job, in association with the print job identification information registered in step S904. When a print job to which user information, which does not indicate a user name, is added is transmitted from the information terminal 101, the print job manager 512 registers, in the print job table 601, a predetermined user name and the terminal name, which is indicated by the user information added to the acquired print job, in association with the print job identification information registered in step S903.

For example, it is assumed that the user information, which does not include a user name, is added to a print job that has been transmitted from the information terminal 101. In that case, as illustrated by the user name associated with print job number 8 in the print job table 601 exemplified in FIG. 6, "Unknown User" as a predetermined user name is registered in the print job table 601.

In step S906, the print job manager 512 determines whether or not owner discriminating information is added to the acquired print job.

In step S906, if no owner discriminating information is added to the print job, in step S907, the print job manager 512 decides on a folder name according to the user information added to the acquired print job. Then, the controller 509 shifts the processing to step S1001 illustrated in FIG. 10.

For example, it is assumed that no owner discriminating information is added to a print job transmitted from the information terminal 101, and the user information added to the transmitted print job indicates a combination of the user name "USER B" and the terminal name "PC B". In that case, in the print job table 601 exemplified in FIG. 6, as illustrated by the folder name associated with print job number 4, the folder name is USER B/PC B. Further, a folder having the folder name "USER B/PC B" is the storage destination for the print data associated with print job number 4. That is, when the owner discriminating information is not added but the user information is added to a print job, the print job manager 512 stores the print job in the storage destination decided according to the user information.

Meanwhile, in step S906, if the owner discriminating information is added to the print job, in step S908, the print job manager 512 registers, in the print job table 601, the owner discriminating information added to the acquired print job in association with the print job identification information registered in step S903.

In step S909, the print job manager 512 decides on a folder name according to the owner discriminating information added to the acquired print job. Then, the controller 509 shifts the processing to step S1001 illustrated in FIG. 10.

For example, it is assumed that a type indicated by the owner discriminating information added to the acquired print job represents the user account. In that case, the print job manager 512 decides on, for the folder which indicates the storage destination of the print job in question, a folder name representing the user account indicated by the owner discriminating data which is presented by the owner discriminating information.

For example, it is assumed that the owner discriminating information added to the acquired print job indicates a combination of the type, which represents the user account, and the owner discriminating data, which is USERID-A, representing the user account. In that case, the print job manager 512 decides on a folder name as USERID-A for the folder indicating the storage destination of the print job in question.

Further, for example, it is assumed that the type included in the owner discriminating information added to the acquired print job represents a face image, and the owner discriminating data included in the owner discriminating information is encoded. In that case, the print job manager 512 decides on, for the folder which indicates the storage destination of the print job in question, a folder name representing a readable character string instead of the owner discriminating data included in the owner discriminating information.

Figure 10:
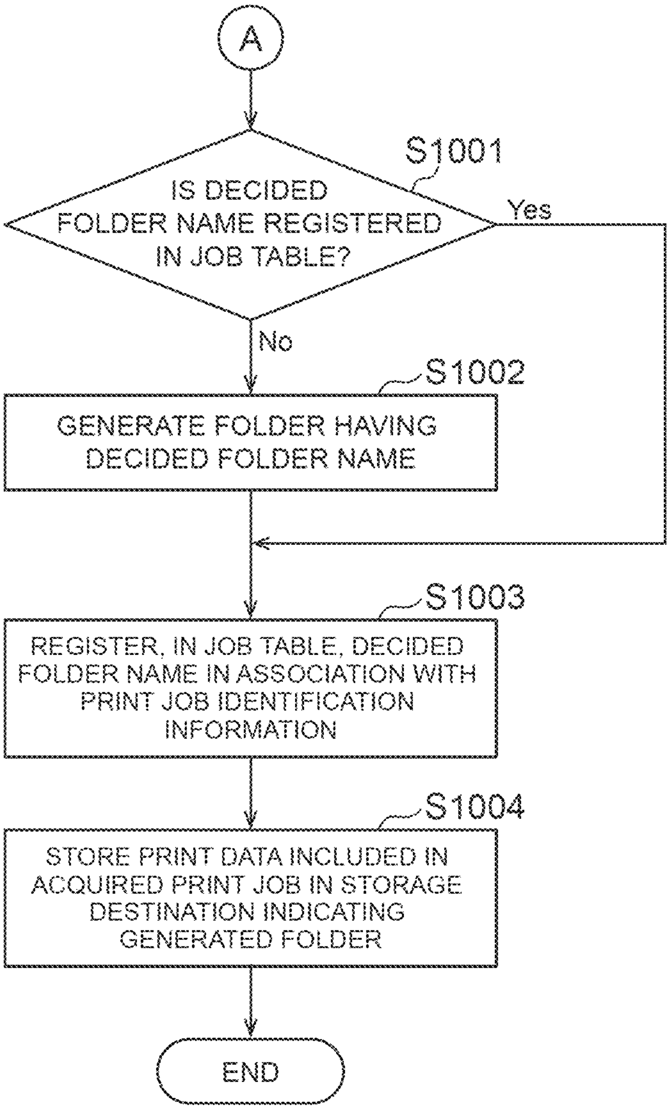
FIG. 10 is a flowchart illustrating an example of processing subsequent to FIG. 9 in the image forming apparatus.

FIG. 10 is a flowchart illustrating an example of processing subsequent to FIG. 9 in the image forming apparatus 102.

In step S1001, it is determined whether or not the folder name decided in step S907 illustrated in FIG. 9 or step S909 illustrated in FIG. 9 is registered in the print job table 601. In step S1001, if the folder name decided in step S907 or step S909 is registered in the print job table 601, the controller 509 shifts the processing to step S1003.

Meanwhile, in step S1001, if the folder name decided in step S907 or step S909 is not registered in the print job table 601, the print job manager 512 generates, in step S1002, a folder having the decided folder name. Specifically, the print job manager 512 generates a folder having the decided folder name in the HDD 508.

In step S1003, the print job manager 512 registers, in the print job table 601, the decided folder name in association with the print job identification information registered in step S904 illustrated in FIG. 9.

In step S1004, the print job manager 512 stores the print data added to the acquired print job in a storage destination corresponding to the folder having the decided folder name. Specifically, the print job manager 512 converts the print data into raster data and generates a raster image processor (RIP) image. The raster image is image data of each page. The print job manager 512 uses the RAM 507 when performing processing of converting the print date into raster data. Then, the print job manager 512 stores the generated RIP image in the folder having the decided folder name.

As described above, when owner discriminating information is added to a print job, the storage destination of the print data added to the print job is the folder having the folder name decided according to the owner discriminating information. Therefore, even if the information terminals 101, which are the transmission sources for transmitting a plurality of print jobs, are different, the image forming apparatus 102 stores, in the same storage destination, pieces of print data added to the respective print jobs to which the same owner discriminating information is added. That is, for the print data selected by the same owner, the image forming apparatus 102 can store the print job in the storage destination decided according to the owner. Therefore, the image forming apparatus 102 can manage the print jobs according to each owner of the print job. Then, the controller 509 ends the processing.

Figure 11:
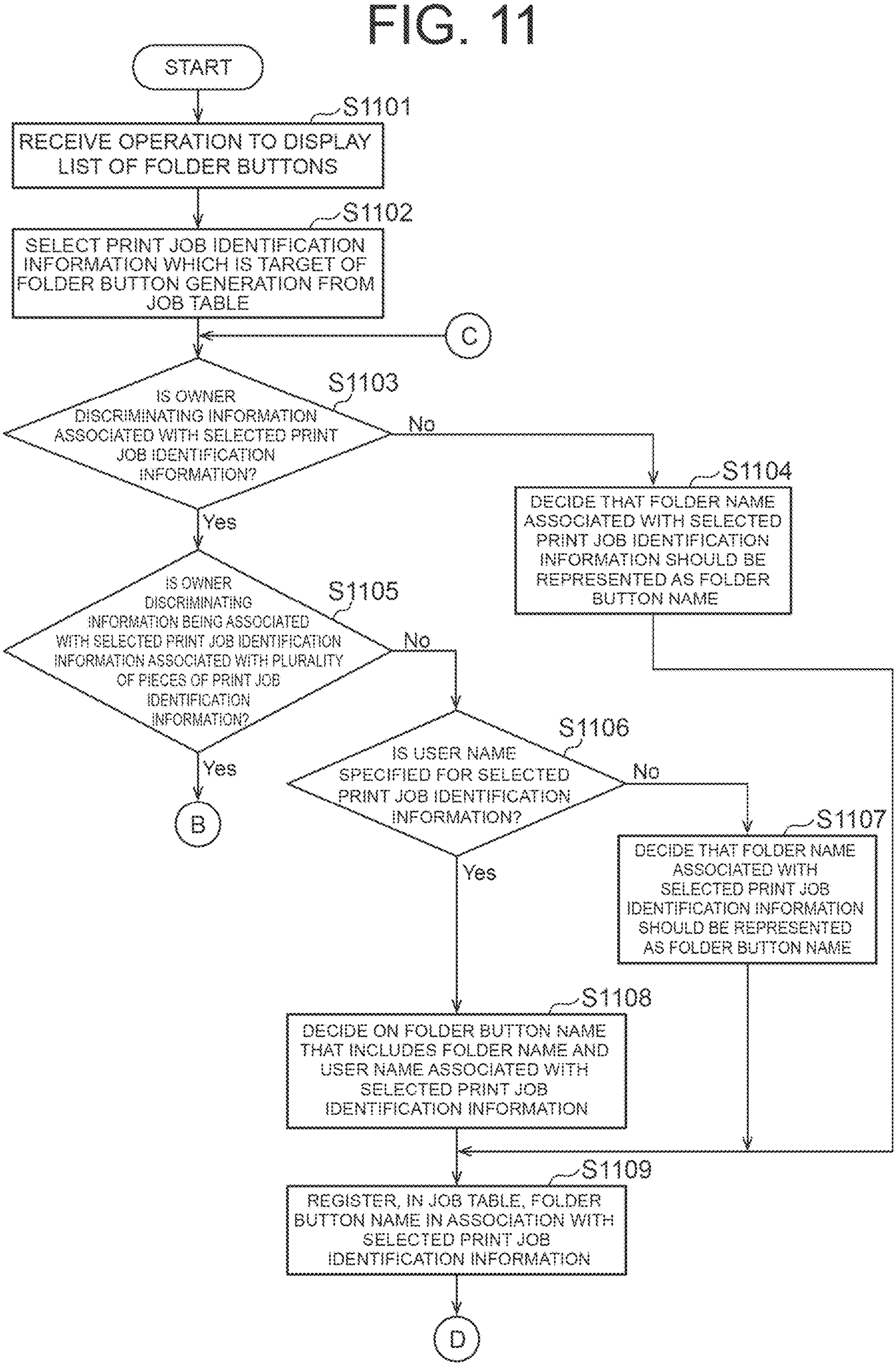
FIG. 11 is a flowchart illustrating an example of processing of selecting a print job in the image forming apparatus.

FIG. 11 is a flowchart illustrating an example of processing of selecting a print job in the image forming apparatus 102.

In step S1101, when the operation receiver 501 has received an operation to display a list of folder buttons, the display controller 513 determines that an operation to display a list of folder buttons has been received. For example, when the operation receiver 501 has received an operation to select a simple private mailbox button 1301 (see FIG. 13) displayed on the display 502, the display controller 513 determines that an operation to display a list of folder buttons has been received.

In step S1102, the display controller 513 selects the print job identification information, which is a target of folder button generation, from the print job table 601.

In step S1103, the display controller 513 determines whether or not owner discriminating information is associated with the selected print job identification information. If no owner discriminating information is associated with the selected print job identification information, in step S1104, the display controller 513 decides that the folder name associated with the selected print job identification information should be represented as the folder button name. Specifically, if no owner discriminating information is associated with the selected print job identification information, the display controller 513 decides that the folder name, which has been decided according to the user information added to the print job, should be represented as the folder button name.

For example, it is assumed that no owner discriminating information is associated with the print job transmitted from the information terminal 101, and that the user name indicated by the user information added to the print job transmitted from the information terminal 101 is USER B, and the terminal name included in the aforementioned user information is PC B. In that case, in step S907, the print job manager 512 decides on the folder name as USER B/PC B. Then, in step S1104, the display controller 513 decides on the folder button name as USER B/PC B. Then, the controller 509 shifts the processing to step S1109.

Meanwhile, if the owner discriminating information is associated with the selected print job identification information, in step S1105, the display controller 513 determines whether or not the owner discriminating information being associated with the selected print job identification information is associated with a plurality of pieces of print job identification information in the print job table 601. In step S1105, if the owner discriminating information associated with the selected print job identification information is associated with a plurality of pieces of print job identification information, the controller 509 proceeds to step S1201 illustrated in FIG. 12.

Meanwhile, in step S1105, if the owner discriminating information associated with the selected print job identification information is not associated with a plurality of pieces of print job identification information, the display controller 513 determines, in step S1106, whether or not a user name is specified for the selected print job identification information.

Specifically, the display controller 513 determines whether or not a user name different from a predetermined user name is associated with the selected print job identification information.

In a case where user information, which does not indicate a user name, is added to a print job transmitted from the information terminal 101, a predetermined user name is registered in the print job table 601 in association with the print job identification information in step S904 illustrated in FIG. 9. Thus, the user name is not specified. Meanwhile, in a case where user information, which indicates the user name, is added to a print job transmitted from the information terminal 101, the user name indicated by the user information is registered in the print job table 601 in association with the print job identification information in step S904. Thus, the user name is specified.

In step S1106, if the user name is not specified for the selected print job identification information, in step S1107, the display controller 513 decides that the folder name associated with the selected print job identification information should be represented as the folder button name. Specifically, if the user name is not specified for the selected print job identification information, it is decided that the folder name decided in step S909 illustrated in FIG. 9 should be represented as the folder button name. Then, the controller 509 shifts the processing to step S1109.

Meanwhile, in step S1106, if the user name is specified for the selected print job identification information, in step S1108, the display controller 513 decides on a folder button name that includes the user name associated with the selected print job identification information and the folder name associated with the selected print job identification information.

For example, it is assumed that, when print job identification information including print job number 1 is selected, the user name "USER A" and the folder name "USERID-A" are registered in the print job table 601 in association with the selected print job identification information. In that case, the display controller 513 decides on a folder button name as "USER A/[USERID-A]". Then, the controller 509 shifts the processing to step S1109.

In step S1109, the display controller 513 registers the folder button name, which has been decided in step S1104, step S1107, or step S1108, in the print job table 601 in association with the selected print job identification information. Then, the display controller 513 shifts the processing to step S1204 illustrated in FIG. 12.

Figure 12:
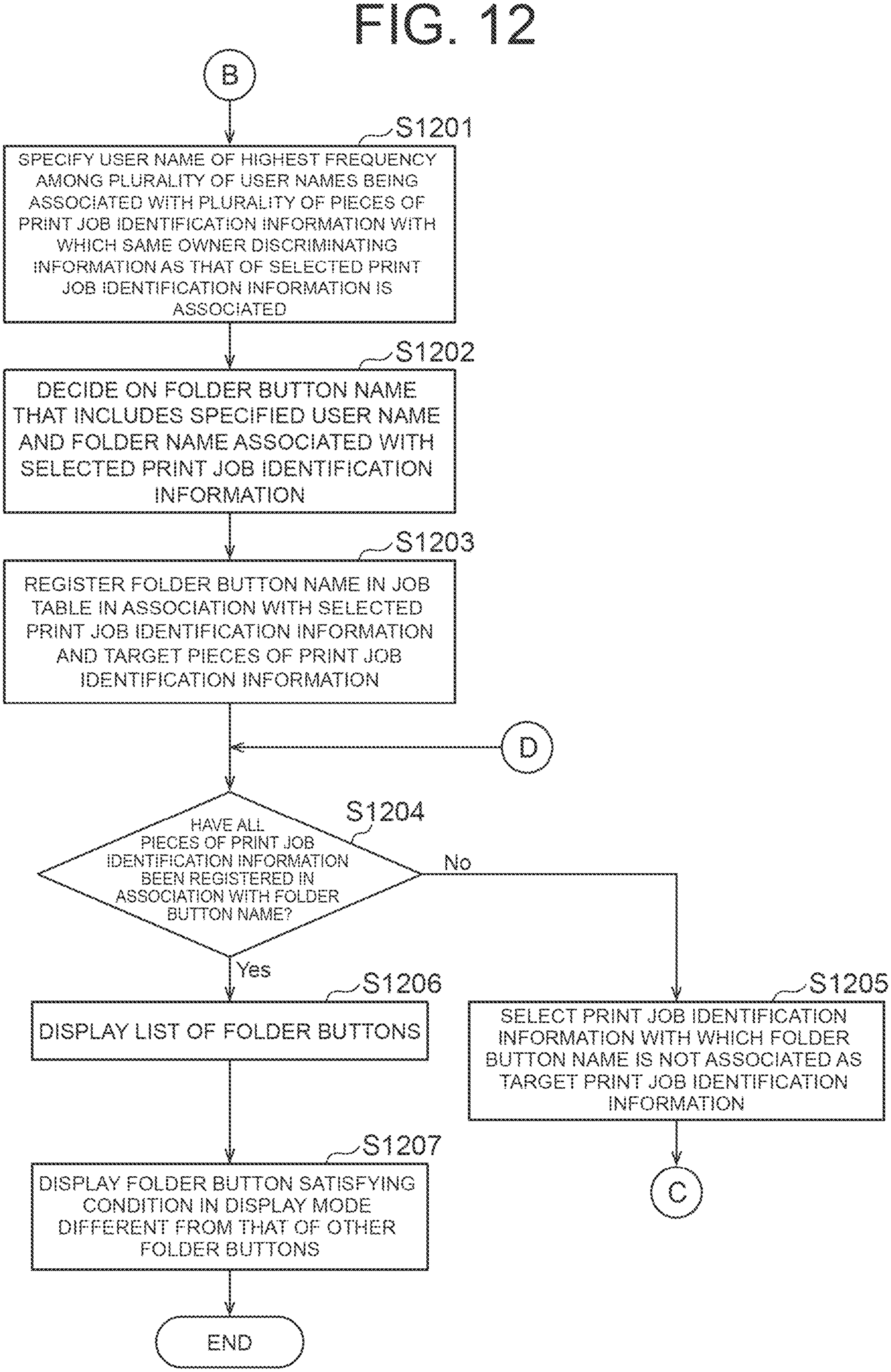
FIG. 12 is a flowchart illustrating an example of processing subsequent to FIG. 11 in the image forming apparatus.

FIG. 12 is a flowchart illustrating an example of processing subsequent to FIG. 11 in the image forming apparatus 102.

In step S1105 illustrated in FIG. 11, if the owner discriminating information associated with the selected print job identification information is associated with a plurality of pieces of print job identification information, in step S1201, the display controller 513 specifies the user name that is most frequently included among a plurality of user names being associated with target pieces of print job identification information with which the same owner discriminating information as that of the selected print job identification information is associated.

In step S1202, the display controller 513 decides on a folder button name that includes the specified user name and the folder name being associated with the selected print job identification information. By virtue of the processing from step S1201 to step S1202, the folder button name is to include the user name that is most frequently included among the plurality of user names which are each indicated by the user information added to a plurality of print jobs to which the same owner discriminating information is added. That is, the display controller 513 decides on the folder button name that includes the user name of the highest frequency of use by the user who is the owner of the print job.

In step S1203, the display controller 513 registers the decided folder button name in the print job table 601 in association with the selected print job identification information and the target pieces of print job identification information.

In step S1204, the display controller 513 determines whether or not all pieces of print job identification information registered in the print job table 601 have been registered in association with the folder button name. In step S1204, if not all pieces of print job identification information registered in the print job table 601 have been registered in association with the folder button name, in step S1205, the display controller 513 selects the print job identification information with which the folder button name is not associated as the target print job identification information. Then, the controller 509 returns the processing to step S1103 illustrated in FIG. 11.

Meanwhile, in step S1204, if all pieces of print job identification information registered in the print job table 601 have been registered in association with the folder button name, in step S1206, the display controller 513 causes the display 502 to display a list of folder buttons having the folder button name registered in the print job table 601. Specifically, the display controller 513 causes the display 502 to display a folder selection screen 1302 (see FIG. 13) showing a list of folder buttons.

In step S1207, the display controller 513 causes the display 502 to display a folder button satisfying a condition in a display mode different from that of the other folder buttons. Specifically, the display controller 513 causes the display 502 to display a folder button that has not been operated yet, and a folder button for which a predetermined time has not elapsed since the folder name was decided, in a display mode different from that of the other folder buttons. For example, the display controller 513 causes the display 502 to display a folder button that has not been operated yet, and a folder button for which a predetermined time has not elapsed since the folder name was decided, in a color different from that of the other folder buttons, in a different thickness of character, or by a blinking display. Alternatively, the display controller 513 may cause the folder button that has not been operated yet, and the folder button for which a predetermined time has not elapsed since the folder name was decided to blink when those folder buttons are displayed on the display 502.

When the user information including the user name set to the information terminal 101 is added to the print job, the folder button name includes such a user name. However, there are cases where the user does not remember the user name set to the information terminal 101. In that case, it may take some time for the user to find, from the list of folder buttons displayed on the folder selection screen 1302, a folder in which a desired print job is stored. However, by virtue of the processing of step S1207, the folder button that has not been operated yet and the folder button for which a predetermined time has not elapsed since the folder name was decided are displayed on the display 502 to be more conspicuous than the other buttons. As a result, the image forming apparatus 102 can allow the user to easily find a folder button that has not been operated yet and a folder button for which a predetermined time has not elapsed since the folder name was decided.

Further, by virtue of the processing of step S1202 and the processing of step S1206, the display controller 513 causes the display 502 to display a folder button having the folder button name indicating the user name of the highest frequency of use by the user who is the owner of the print job. Consequently, the image forming apparatus 102 can allow the user to easily select a folder in which the desired print job is stored.

Figure 13:
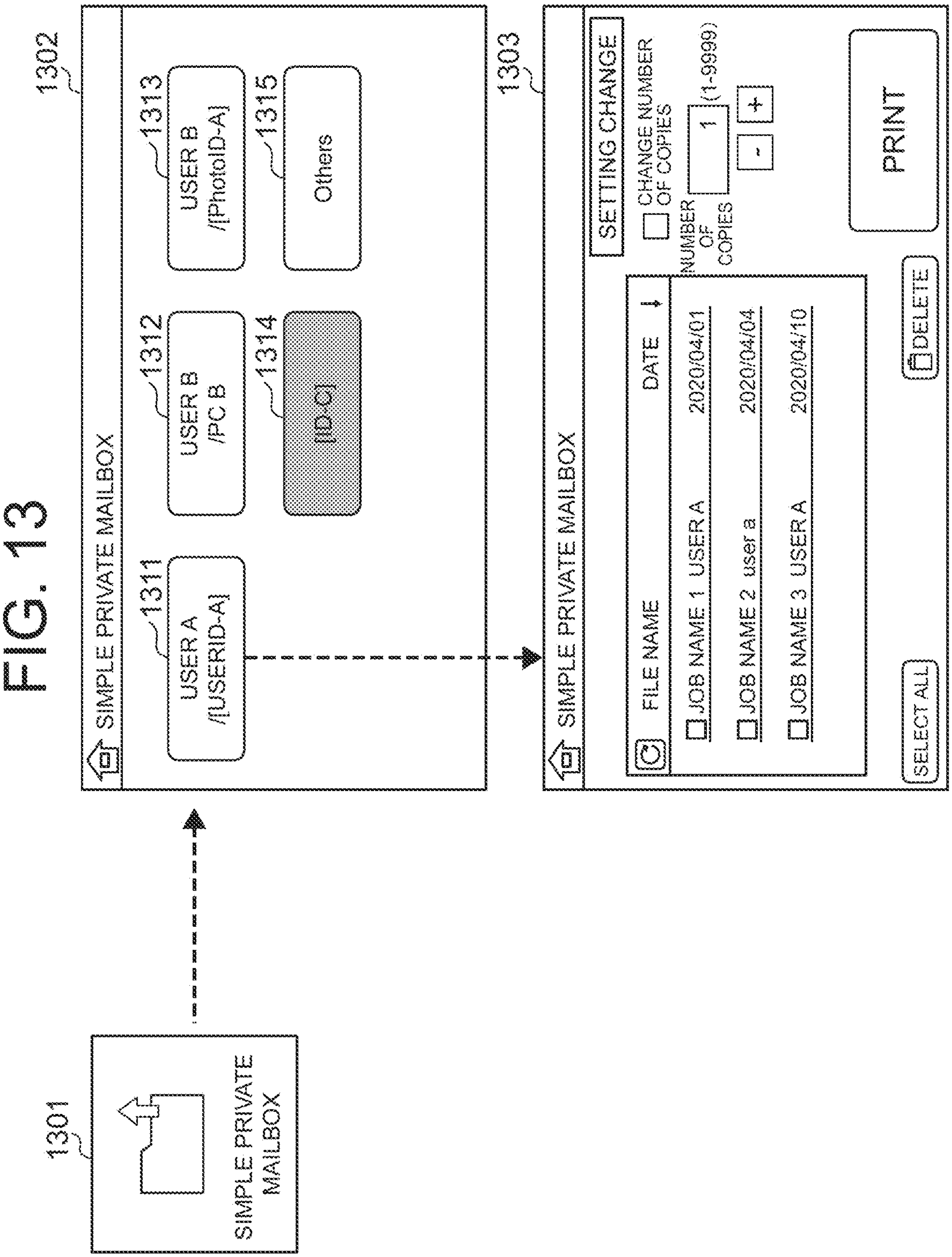
FIG. 13 is a diagram illustrating an example of a screen transition on a display of the image forming apparatus.

FIG. 13 is a diagram illustrating an example of a screen transition on the display 502.

When the operation receiver 501 has received an operation to select the simple private mailbox button 1301 that is displayed on the display 502, the display controller 513 determines that an operation to display a list of folder buttons has been received, and executes the processing from step S1103 illustrated in FIG. 11 to step S1207 illustrated in FIG. 12. Consequently, the display controller 513 causes the display 502 to display the folder selection screen 1302 (see FIG. 13). The folder selection screen 1302 includes folder buttons 1311 to 1315.

The folder button 1311 has the folder button name "USER A/[USERID-A]". The folder button 1311 has the folder button name decided in step S1202 illustrated in FIG. 12.

The folder button 1312 has the folder button name "USER B/PC B". The folder button 1312 has the folder button name decided in step S1104 illustrated in FIG. 11.

The folder button 1313 has the folder button name "USER B/[PhotoID-A]". The folder button 1313 has the folder button name decided in step S1108.

The folder button 1314 has the folder button name "[ID-C]". The folder button 1314 has the folder button name decided in step S1107 illustrated in FIG. 11.

The folder button 1315 has the folder button name "Others" indicating a predetermined folder name. In the folder indicated by the folder button 1315, a print job stored by the processing of step S903 illustrated in FIG. 9 is stored. Further, the folder indicated by the folder button 1315 stores therein a print job stored by the processing of step S1004 illustrated in FIG. 10 when a folder, which has the folder name decided in the processing of step S1002 illustrated in FIG. 10, becomes a target of deletion due to the number of folders storing the print jobs having reached an upper limit.

For example, it is assumed that the folder button 1314 has not been operated yet, or a predetermined time has not elapsed since the folder name indicated by the folder button 1314 was decided. In that case, as illustrated by the folder selection screen 1302, the folder button 1314 is displayed in a color different from those of the folder buttons 1311 to 1313 and the folder button 1315. That is, a folder button that has not been operated yet and a folder button for which a predetermined time has not elapsed since the folder name was decided are displayed to be more emphasized than the other folder buttons.

When the user performs an operation to transmit a print job to the image forming apparatus 102 by using the information terminal 101, the user may perform, subsequently to the transmission operation, an operation on the image forming apparatus 102 to print the print data added to the transmitted print job. In that case, the print job desired by the user, which has been transmitted to the image forming apparatus immediately before by the user operation, is stored in a folder indicated by the folder button that has not been operated yet or a folder indicated by the folder button for which a predetermined time has not elapsed since the folder name was decided, when the user operates the image forming apparatus 102. Thus, as the image forming apparatus 102 displays the folder button that has not been operated yet, and the folder button for which a predetermined time has not elapsed since the folder name was decided to be more emphasized than the other folder buttons, it is possible to allow the user to easily visually recognize the folder button indicating the folder in which the desired print job is stored.

For example, it is assumed that print jobs including those of print job numbers 1 to 3 exemplified in the print job table 601 illustrated in FIG. 6 are stored in a folder indicated by the folder button 1311. As illustrated in FIG. 6, the print job name "JOB NAME 1" and the user name "USER A" are associated with print job number 1. Further, as illustrated in FIG. 6, the print job name "JOB NAME 2" and the user name "user a" are associated with print job number 2. Furthermore, as illustrated in FIG. 6, the print job name "JOB NAME 3" and the user name "USER A" are associated with print job number 3.

The print job manager 512 allows the print job, which is stored in the folder indicated by the folder button selected by the operation of the user on the image forming apparatus 102, to be selected and executed. For example, it is assumed that the operation receiver 501 has received an operation to select the folder button 1311. In that case, the display controller 513 causes the display 502 to display a screen 1303. In that case, the screen 1303 displays a print job indicating "JOB NAME 1" and "USER A", a print job indicating "JOB NAME 2" and "user a", and a print job indicating "JOB NAME 3" and "USER A" in such a way that these print jobs can be selected and executed.

Further, the print job manager 512 may select a folder satisfying a deletion condition as a target of deletion when the number of folders storing the print job reaches an upper limit number. That is, the print job manager 512 may decide on the order of priority of the folder corresponding to the target of deletion according to the deletion condition. The deletion condition relates to at least any one condition selected from the group consisting of a print history of the print job, the state of the image forming apparatus 102, and the presence or absence of a password relating to the print job.

For example, if the number of times of execution for a folder is zero regarding a print history of a print job, the print job manager 512 determines that the folder storing the print job in question is the folder satisfying the deletion condition. The number of times of execution for a folder is the number of times that the image forming apparatus 102 has printed the print data added to the print job stored in the folder in question.

In addition, for example, the print job manager 512 determines that a folder whose cumulative number of times of execution for a folder regarding a history of a print job is one or more times, and has the smallest cumulative number of times of execution among the cumulative numbers of times of execution for a plurality of folders is the folder satisfying the deletion condition. The cumulative number of times of execution for a folder is the total number of times that the image forming apparatus 102 has printed the print data added to the print job stored in the folder in question.

Also, if the image forming apparatus 102 is in a state of being unable to execute printing of the print job, the print job manager 512 determines that the folder storing the print job in question satisfies the deletion condition. For example, in a case where the paper discharge tray 29 or the paper feed tray 20 cannot be used or is prohibited from being used, the image forming apparatus 102 is in a state in which a print job cannot be executed for printing. Further, for example, in a case where an upper limit of the number of sheets to be printed is set in the image forming apparatus 102, and the number of printed sheets has reached the upper limit of the number of sheets to be printed, the image forming apparatus 102 is in a state in which printing of a print job cannot be executed.

Further, for example, it is assumed that one folder stores therein a print job to which a password is set, and another folder does not store therein a print job to which a password is set. In that case, the print job manager 512 may decide whether the folder satisfies the deletion condition according to whether the folder stores a print job to which a password is set.

When the print job manager 512 has selected a folder satisfying the deletion condition as the target of deletion, the print job manager 512 deletes the folder of the target of deletion. In this way, the image forming apparatus 102 can prevent the number of folders in which the print jobs are stored from exceeding the upper limit number.

Each of the processes executed in the above embodiments is not limited to the processing mode exemplified in each of the embodiments. The above-described functional blocks may be implemented by using either a logic circuit (hardware) formed in an integrated circuit or the like or software using a CPU. Each of the processes executed in the above embodiments may be executed by a plurality of computers. For example, in the processes executed by the respective functional blocks of the controller 509 of the image forming apparatus 102, a part of the processes may be executed by another computer, or all of the processes may be respectively allocated to and executed by a plurality of computers.

The present disclosure is not limited to the above-described embodiments, and may be replaced with a configuration which is substantially the same as the configuration indicated in the above-described embodiments, a configuration which exhibits the same effects and advantages, or a configuration which can achieve the same object. In the present disclosure, an embodiment obtained by combining, as appropriate, technical measures respectively disclosed in different embodiments is also included in the technical scope of the present disclosure. Furthermore, a new technical feature can be formed by combining the technical measures respectively disclosed in the embodiments.

What is claimed is:

1. An image forming apparatus comprising:

at least one processor; and at least one non-transitory computer-readable medium coupled to the at least one processor and storing one or more computer-executable instructions that, when executed by the at least one processor, cause the image forming apparatus to:

acquire a print job;

when owner discriminating information, according to which a user is uniquely discriminable, is added to the print job, store the print job in a storage destination determined according to the owner discriminating information;

display, on a display of the image forming apparatus, information of the storage destination; and perform one of:

generating the owner discriminating information from a set user account, detecting a first feature from a face image, which has been acquired by capturing an image of a face of the user by an information terminal, and generating the owner discriminating information from the detected first feature, or detecting a second feature from fingerprint data, which has been acquired by the information terminal, and generating the owner discriminating information from the detected second feature.

2. The image forming apparatus according to claim 1, wherein the one or more computer-executable instructions, when executed by the at least one processor, further cause the image forming apparatus to:

add, to the print job, user information indicating at least one of a terminal name, which is assigned to the information terminal serving as a transmission source of the print job, and a user name, which indicates a user of the information terminal.

3. The image forming apparatus according to claim 1, wherein the owner discriminating information belongs to a type decided according to setting information related to an action of the information terminal serving as a transmission source of the print job.

4. The image forming apparatus according to claim 1, wherein:

the storage destination includes a folder, and the one or more computer-executable instructions, when executed by the at least one processor, further cause the image forming apparatus to determine a folder name of the folder based on the owner discriminating information.

5. The image forming apparatus according to claim 4, wherein the one or more computer-executable instructions, when executed by the at least one processor, further cause the image forming apparatus to:

add, to the print job, user information indicating at least one of a terminal name, which is assigned to the information terminal serving as a transmission source of the print job, and a user name, which indicates a user of the information terminal; and display, on the display, a folder button which has a folder button name determined according to the user information and the owner discriminating information, and via which the print job is selectable.

6. The image forming apparatus according to claim 5, wherein the folder button name includes a user name that is most frequently included among a plurality of user names, each of which indicated by the user information added to a plurality of print jobs to which same owner discriminating information is added.

7. The image forming apparatus according to claim 5, wherein:

the folder button is a first folder button, and the one or more computer-executable instructions, when executed by the at least one processor, further cause the image forming apparatus to:

display, on the display, a second folder button that has not been operated yet, and a third folder button indicating a folder for which a predetermined time has not elapsed since the determination of the folder name, wherein display modes of the first, second, and third folder buttons are different from each other.

8. The image forming apparatus according to claim 2, wherein the one or more computer-executable instructions, when executed by the at least one processor, further cause the image forming apparatus to:

when the owner discriminating information is not added to the print job, but the user information is added to the print job, store the print job in a storage destination determined according to the user information.

9. The image forming apparatus according to claim 5, wherein the one or more computer-executable instructions, when executed by the at least one processor, further cause the image forming apparatus to:

allow the print job, which is stored in the folder indicated by the folder button selected by an operation of the user on the image forming apparatus, to be selected and executed.

10. The image forming apparatus according to claim 1, wherein the owner discriminating information is selectable by an operation of another user on the information terminal serving as a transmission source of the print job.

11. The image forming apparatus according to claim 4, wherein:

the one or more computer-executable instructions, when executed by the at least one processor, further cause the image forming apparatus to:

select a folder that satisfies a deletion condition, as a target of deletion, when a number of folders storing the print job reaches an upper limit number, wherein the deletion condition is associated with at least one condition selected from the group consisting of a print history of the print job, a state of the image forming apparatus, and a presence or absence of a password relating to the print job.

12. A printing system including:

an image forming apparatus; and an information terminal which transmits a print job to the image forming apparatus, the image forming apparatus comprising:

at least one processor; and at least one non-transitory computer-readable medium coupled to the at least one processor and storing one or more computer-executable instructions that, when executed by the at least one processor, cause the image forming apparatus to:

acquire the print job from the information terminal;

when owner discriminating information, according to which a user is uniquely discriminable, is added to the print job, store the print job in a storage destination determined according to the owner discriminating information; and perform one of:

generating the owner discriminating information from a set user account, detecting a first feature from a face image, which has been acquired by capturing an image of a face of the user by the information terminal, and generating the owner discriminating information from the detected first feature, or detecting a second feature from fingerprint data, which has been acquired by the information terminal, and generating the owner discriminating information from the detected second feature.

* * * * *